United States Patent
Purvis et al.

(10) Patent No.: US 7,243,303 B2
(45) Date of Patent: *Jul. 10, 2007

(54) CONSTRAINT-OPTIMIZATION SYSTEM AND METHOD FOR DOCUMENT COMPONENT LAYOUT GENERATION

(75) Inventors: Lisa S Purvis, Fairport, NY (US);
Steven J Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 885 days.

This patent is subject to a terminal disclaimer.

(21) Appl. No.: 10/202,046

(22) Filed: Jul. 23, 2002

(65) Prior Publication Data

US 2004/0019850 A1 Jan. 29, 2004

(51) Int. Cl.
*G06F 15/00* (2006.01)
*G06F 17/00* (2006.01)
(52) U.S. Cl. .................. 715/517; 715/518; 715/519; 715/520; 715/521
(58) Field of Classification Search ............... 715/525, 715/517, 518–521; 707/100, 517; 345/620, 345/670; 395/767
See application file for complete search history.

(56) References Cited

U.S. PATENT DOCUMENTS

| 5,224,206 | A |   | 6/1993 | Simoudis |
| 5,434,953 | A | * | 7/1995 | Bloomberg ............... 345/670 |
| 5,438,512 | A | * | 8/1995 | Mantha et al. ............ 715/517 |
| 5,517,621 | A |   | 5/1996 | Fukui et al. |
| 5,649,216 | A | * | 7/1997 | Sieber ...................... 715/506 |

(Continued)

OTHER PUBLICATIONS

Daniela Rus, Customizing Information Capture and Access, Jan. 1997, vol. 15, Issue 1, pp. 67-101, ACM Press.*

(Continued)

*Primary Examiner*—William Bashore

(57) ABSTRACT

What is disclosed is a system and method for specifying a custom document as a multi-criteria constraint optimization problem, and a method to automatically create the specified document using existing constraint optimization solving algorithms. The present method specifies the document, its content components, its layout requirements, and its desired aesthetic criteria are expressed as elements of a constraint optimization problem which when solved, results in an automated document layout for the set of content components that satisfies not only certain primitive content and layout constraints, but which also advantageously fulfills desired design properties and which provides a way to ensure that the generated document is well designed. The method for automatic document layout comprises the steps of determining a set of variables that can be adjusted to achieve a satisfactory layout; expressing said satisfactory layout as a set of constraints on said determined set of variables wherein at least one of said set of constraints is expressed as being optimizable; and solving said constraints to find a layout which solves for the variables over the constraints. The system for automatic document layout on multi-function office equipment comprises means for document layout constraint acquisition; means for document layout variable specification which specifies a set of variables that can be adjusted to achieve a satisfactory layout; means for relationship-constraint to optimization-constraint conversion which expresses said satisfactory layout as a set of constraints on said set of variables wherein at least one of said set of constraints is expressed as being optimizable; and means for constraint optimization for solving said constraints to find a layout which solves for the variables over said constraints.

8 Claims, 2 Drawing Sheets

U.S. PATENT DOCUMENTS

| | | | |
|---|---|---|---|
| 5,845,303 A * | 12/1998 | Templeman | 715/517 |
| 5,911,146 A * | 6/1999 | Johari et al. | 715/525 |
| 5,943,670 A | 8/1999 | Prager | |
| 6,014,678 A | 1/2000 | Inoue et al. | |
| 6,023,714 A | 2/2000 | Hill et al. | |
| 6,044,384 A | 3/2000 | Ishima et al. | |
| 6,134,563 A | 10/2000 | Clancey et al. | |
| 6,173,286 B1 * | 1/2001 | Guttman et al. | 707/100 |
| 6,212,528 B1 | 4/2001 | Brophy et al. | |
| 6,366,918 B1 * | 4/2002 | Guttman et al. | 707/100 |
| 6,668,354 B1 | 12/2003 | Chen et al. | |
| 2001/0051962 A1 | 12/2001 | Plotkin | |
| 2002/0111969 A1 * | 8/2002 | Halstead, Jr. | 707/517 |
| 2004/0019847 A1 | 1/2004 | Purvis | |
| 2004/0019851 A1 | 1/2004 | Purvis | |
| 2004/0019852 A1 | 1/2004 | Purvis | |
| 2004/0019855 A1 | 1/2004 | Purvis | |
| 2004/0024613 A1 | 2/2004 | Harrington | |
| 2004/0025109 A1 | 2/2004 | Harrington | |
| 2004/0034613 A1 | 2/2004 | Purvis | |
| 2004/0205472 A1 | 10/2004 | Purvis | |
| 2004/0205588 A1 | 10/2004 | Purvis | |
| 2004/0205609 A1 | 10/2004 | Milton et al. | |

OTHER PUBLICATIONS

Dengler, E. Friedell, M., Marks, J., Constraint-Driven Diagram Layout, Proceedings of the 1993 IEEE Symposium on Visual Languages, pp. 330-335, Bergen, Norway, 1993 (diagrams).

Rousseau, F., Garcia-Macias, A., Valdeni de Lima, J., and Duda, A., *User Adaptable Multimedia Presentations for the WWW*, Electronic Proceedings from the 8th International World Wide Web Conference, 1999 (multimedia presentations).

Graf, W. H., *The Constraint-Based Layout Framework LayLab and Applications*, Electronic Proceedings of the ACM Workshop on Effective Abstractions in Multimedia, 1995 (flowcharts and yellow pages).

Kroener, A., *The Design Composer: Context-Based Automated Layout for the Internet*, Proceedings of the AAAI Fall Symposium Series: Using Layout for the Generation, Understanding, or Retrieval of Documents, 1999.

Badros G., Borning A., *The Cassowary Linear Arithmetic Constraint Solving Algorithm: Interface and Implementation*, University of Washington Technical Report, Jun. 4, 1998.

Purvis, Lisa, *Document Assembly and Transformation: A Survey*, XR&T/DITC/CADISYS/DI, Mar. 2001.

Holzner, Steven, Inside XML, New Riders Publishing, Indianapolis, IN, © 2001, pp. 68-73, 77-87, 402-412, 620-621, 626-643, 656-660 and 666-671.

Bradley, Keith, et al., "Case-Based User Profiling for Content Personalisation", Proc's of Int'l Conf on Hypermedia, Brusilovsky et al (eds), Adaptive Hyperm. & Adaptive Web-Based Systems Lecture Notes in CS, vol. 1892, Springer Verlag, © 2000 (11 pages).

Villard, Lionel, et al., "An Incremental XSLT Transformation Processor for XML Document Manipulation", WWW 2002, Honolulu, HI, May 7-11, 2002, pp. 474-485.

Mendes, Emilia, et al. "A Comparison of Case-Based Reasoning Approaches to Web Hypermedia Project Cost Estimation", WWW 2002, Honolulu, HI, May 7-11, 2002; pp. 272-280.

* cited by examiner

| AREA A WIDTH | AREA A HEIGHT | AREA A TOPLEFTX | AREA A TOPLEFTY | AREA B WIDTH | AREA B HEIGHT | AREA B TOPLEFTX | AREA B TOPLEFTY |

*FIG. 2*

CONSTRAINT-OPTIMIZATION SYSTEM AND METHOD FOR DOCUMENT COMPONENT LAYOUT GENERATION

FIELD OF THE INVENTION

The present invention is directed to systems and methods to find document components and assemble them into a custom document such as a variable data document and, in particular, those systems and methods which use constraint-optimization approaches wherein the document, its content, components, and its requirements are expressed as a constraint optimization problem.

BACKGROUND OF THE INVENTION

Custom documents are documents that are personalized or tailored in some way to the particular user of the document. Two growing applications of custom documents are in the domain of variable data printing, as well as in web personalization.

Traditional approaches to custom document creation are non-automated and therefore user-intensive, and result in documents that are typically quite similar: the layout is the same for all instances, regardless of the available content pieces. Furthermore, the document creator is responsible for ensuring that the final document adheres to good design principles, and is therefore aesthetically pleasing. Thus the document creator himself typically creates the document template according to his preferred design criteria, which requires knowledge about document design and how to best achieve the desired qualities in a particular instance of the document.

Traditional creation of custom documents such as variable data documents requires expertise in many areas such as graphic arts and databases and is a time consuming process. With the ever-increasing amount of information in the digital world and the amount of untrained users producing documents, old publishing tools often prove cumbersome and demanding whereas present dynamic digital environments demand tools that can reproduce both the contents and the layout automatically tailored to personal needs and which can enable novices to easily create such documents.

Known methods for automated creation of documents have focused more on particular types of documents, and not on modeling the problem in a general way in order to address all types of documents. Existing work provides methods for creating diagrams (see Dengler, E. Friedell, M., Marks, J., *Constraint-Driven Diagram Layout*, Proceedings of the 1993 IEEE Symposium on Visual Languages, pages 330-335, Bergen, Norway, 1993), or multimedia presentations (see Rousseau, F., Garcia-Macias, A., Valdeni de Lima, J., and Duda, A., *User Adaptable Multimedia Presentations for the WWW*, Electronic Proceedings from the 8$^{th}$ International World Wide Web Conference, 1999), or flowcharts and yellow pages (see Graf, W. H., *The Constraint-Based Layout Framework LayLab and Applications*, Electronic Proceedings of the ACM Workshop on Effective Abstractions in Multimedia, 1995). Others have explored automating the process of web document layout (see Kroener, A., *The Design Composer: Context-Based Automated Layout for the Internet*, Proceedings of the AAAI Fall Symposium Series: Using Layout for the Generation, Understanding, or Retrieval of Documents, 1999).

Known methods for a constraint-optimization approaches to document layout use a single optimization criterion: cost, and model their layout task as finding an ordering of stories and advertisements that can minimize the production cost as described in U.S. Pat. No. 6,173,286. The present invention differs in that it offers a more general model for representing a layout problem as a constraint optimization problem, enables the specification of multiple optimization criteria, and provides a process by which to combine required and optimization constraints in order to achieve a well-designed document.

What is needed in the arts in order to ensure that an automatically assembled document also meets desired aesthetic design criteria, is a way to model document creation as a multi-criteria optimization problem, allowing the specification of both required layout constraints as well as desired aesthetic qualities of the output document, and a means to automatically process this combination of hard and soft constraints to automatically generate a well-designed document.

SUMMARY OF THE INVENTION

What is disclosed is a system and method for specifying a custom document as a multi-criteria constraint optimization problem, and a method to automatically create the specified document using existing constraint optimization solving algorithms. The present method specifies the document, its content components, its layout requirements, and its desired aesthetic criteria as elements of a constraint optimization problem which when solved, results in an automated document layout for the set of content components that satisfies not only certain primitive content and layout constraints, but also advantageously fulfills desired design properties and which provides a way to ensure that the generated document is well designed. The method for automatic document layout comprises the steps of determining a set of variables that can be adjusted to achieve a satisfactory layout; expressing said satisfactory layout as a set of constraints on said determined set of variables wherein at least one of said set of constraints is expressed as being optimizable; and solving said constraints to find a layout which solves for the variables over the constraints. The system for automatic document layout on multi-function office equipment comprises means for document layout constraint acquisition; means for document layout variable specification which specifies a set of variables that can be adjusted to achieve a satisfactory layout; means for relationship-constraint to optimization-constraint conversion which expresses said satisfactory layout as a set of constraints on said set of variables wherein at least one of said set of constraints is expressed as being optimizable; and means for constraint optimization for solving said constraints to find a layout which solves for the variables over said constraints.

Other objects, advantages, and salient features of the invention will become apparent from the detailed description which, taken in conjunction with the drawings, disclose the preferred embodiments of the invention.

DESCRIPTION OF THE DRAWINGS

The preferred embodiment and other aspects of the invention will become apparent from the following detailed description when taken in conjunction with the accompanying drawings which are provided for the purpose of describing the invention and not for the limitation thereof, in which:

FIG. 2 illustrates the resulting genome after following through the example of FIG. 1.

DETAILED DESCRIPTION OF THE INVENTION

Figure 1:
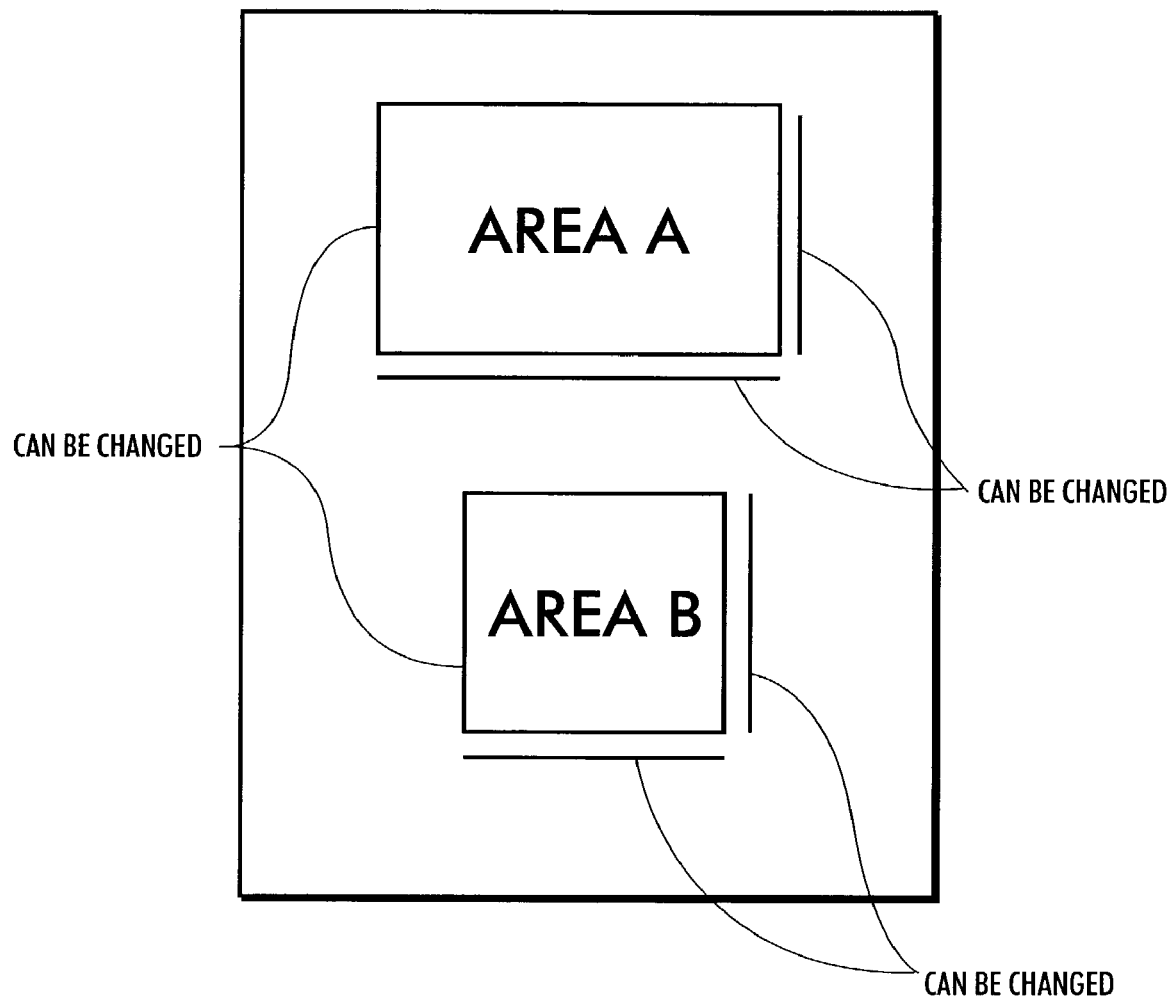
FIG. 1 illustrates a document template which specifies that there are two areas that should be filled with content: areaA and areaB, and which also specifies that the positions and sizes of areaA and areaB can be changed.

What is disclosed is a system and method for specifying a custom document as a constraint optimization problem, and a method to automatically create the specified document using one of a set of many existing constraint optimization algorithms. The document is modeled as a constraint optimization problem which combines both required constraints with non-required design constraints that act as optimization criteria. One of a set of many existing constraint optimization algorithms is then used to solve the problem, resulting in an automatically generated document that is well designed because it has optimized some specified design criteria.

In particular, a document template is represented as a constraint optimization problem, and therefore contains a set of variables, a value domain for each variable, a set of required constraints, and a set of desired constraints (i.e. optimization functions).

In this invention, the areas of the document to be filled with content are modeled as problem variables, as are any parameters of the document that can be changed. As an example, consider the document template shown in FIG. 1. The template specifies that there are two areas that should be filled with content: areaA and areaB. The template also specifies that the positions and sizes of areaA and areaB can be changed. Thus, the problem variables for this example are: areaA, areaB, areaA-topLeftX, areaA-topLeftY, areaB-topLeftX, areaB-topLeftY, areaA-width, areaA-height, areaB-width, areaB-height.

The constraint optimization formulation further specifies that each problem variable has a value domain consisting of the possible values to assign to that variable. This invention teaches that for variables that are document areas to be filled with content (e.g., areaA and areaB of FIG. 1), the value domains are the content pieces that are applicable to each area. For variables that are document parameters, the value domains are discretized ranges for those parameters, so that each potential value for the parameter appears in the value domain e.g., 1 . . . MAXINT]. For variables whose value domains are content pieces, the default domain is set up to be all possible content pieces in the associated content database, which is specified in the document template.

The required constraints specify relationships between variables and/or values that must hold in order for the resulting document to be valid. The desired constraints specify relationships between variables and/or values that we would like to satisfy, but aren't required in order for the resulting document to be valid. Constraints may be unary (apply to one value/variable), binary (apply to two values/variables), or n-ary (apply to n values/variables), and in our invention are entered by the user as part of the document template. An example of a required unary constraint in the document domain is: areaA must contain an image of a castle. An example of a required binary constraint is: areaA-topLeftY+areaA-height<areaB-topLeftY. If we had another variable (areaC), an example of a required 3-ary constraint is: areaA-width+areaB-width>areaC-width. In a variable data application of this invention (one of many possible applications), the constraints would also refer to customer attributes (e.g., areaA must contain an image that is appropriate for customer1.age).

Desired constraints are represented as objective functions to maximize or minimize. For example, a desired binary constraint might be the objective function: f=areaA-width*areaA-height, to be maximized. If more than one objective function is defined for the problem, the problem becomes a multi-criteria optimization problem. If it is a multi-criteria optimization problem, we sum the individual objective function scores to produce the overall optimization score for a particular solution. We can furthermore weight each of the desired constraints with a priority, so that the overall optimization score then becomes a weighted sum of the individual objective function scores.

Any one of the known existing constraint optminzation algorithms is then applied to create the final output document. This invention further describes a means to use a genetic algorithm (one of the many possible constraint optimization algorithms) for doing the constraint optimization and thereby automatically creating a final output document that adheres not only to the required constraints, but also to a set of desired constraints.

In our genetic algorithm formulation of constraint optimization for document creation, the genome is built such that each gene in the genome is a variable of the constraint problem. Following through our example from FIG. 1, the resulting genome is shown in FIG. 2. The unary constraints are used to set up the allowable value domains for each gene. These can be some default range, or input by the user.

In this invention, the fitness function is defined such that it returns a fitness of 0 for any population members that do not meet the required constraints, and for the members that do meet the required constraints, it returns a fitness score that is a sum of the scores of the individual desired constraints. For instance, if we have the required constraints:

C1: areaA-width<300

C2: areaB-width<300

And the desired constraints:

C3: areaA-width=areaB-width, to be maximized
(ranges from 0 to 1)

C4: areaA-height=areaB-height, to be maximized
(ranges from 0 to 1)

Examples of fitness function for these desired constraints are $f3=1-|areaA\text{-}width-areaB\text{-}width|/(areaA\text{-}width+areaB\text{-}width)$ $f4=1-|areaA\text{-}height-areaB\text{-}height|/(areaA\text{-}width+areaB\text{-}height)$ If we have a population member with areaA-width=350, areaA-height=350, areaB-width=400, areaB-height=200, the fitness function returns a score of 0. If, however, we have a population member with areaA-width=300, areaA-height=200, areaB-width=300, areaB-height=200, the fitness function returns a score of 2. If we have a population member with areaA-width=225, areaA-height=200, areaB-width=300, areaB-height=200, the fitness function returns a score of 1.875.

Our formulation also extends to allow weighting of the various desired constraints. Thus, the document creator can specify that certain desired constraints are more important than others. For instance, we could have constraint C3 weighted with an importance of 1.5, and C4 weighted with an importance of 0.5, meaning that the two objects having the same width is more important than the two objects having the same height. The fitness function's overall score is then computed as a weighted sum of the individual desired constraints.

For instance, if we have a population member with areaA-width=225, areaA-height=200, areaB-width=300, areaB-height=200, desired constraint C3 returns 0.875, which is multiplied by C3's weight of 1.5, to get 1.286. Desired constraint C4 returns 1, which is multiplied by C4's weight of 0.5, to get 0.5. The overall fitness score is then 1.125+0.5=1.786.

If, on the other hand, we have a population member with areaA-width=300, areaA-height=200, areaB-width=300, areaB-height=150, desired constraint C3 returns 1, which is multiplied by C3's weight of 1.5 to get 1.5. Desired constraint C4 returns 0.875, which is multiplied by C4's weight of 0.5, to get 0.438. The overall fitness score is then 1.5+0.438=1.938, thereby preferring the solution that violates C3 the least.

In the genetic algorithm implementation of this invention, we create an initial population of chromosomes by selecting values for each gene, and doing this for the desired number of population members. We evaluate each member of this population according to the fitness function, resulting in a score for each population member. We then select the most fit individuals (i.e., best fitness score) as parents for the new population, and create a new population from the parents using crossover/mutation operations. We iterate through populations until we reach a specified stopping condition (e.g., a certain number of iterations are complete, or until we have crossed a minimum threshold for the fitness function).

Thus, each genome is evaluated according to how well it satisfies or achieves the design qualities along with the other required constraints. This results in a generated document that not only satisfies the required constraints, but that is also optimized for the specified design qualities.

The system and method of the present invention has many advantages over the prior art. Whereas the current constraint satisfaction approaches often require many low-level layout constraints to be specified in order to achieve a reasonable result, the genetic algorithm approach disclosed herein allows a specification of a few high-level desired constraints and qualities—a much more intuitive and less user-demanding process. Another advantage of the constraint optimization approach described herein is that it can find pleasing solutions for any combination of content thereby enabling more dynamic custom document instances. In addition, selection of content can be influenced by the design criteria that is included in the solving process by creating genes that specify the number of items to include for each content area and, as the gene value varies, the content items included vary as well. Another advantage of the present constraint-optimization system and method is that the various aesthetic criteria can be weighted and result in a different output document based on the weightings (e.g., a different output document would be generated if compactness was heavily weighted than if page utilization was heavily weighted).

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is desired to be secured by United States Letters Patent is:

What is claimed is:

1. A method for automatic document component layout comprising:
    (a) determining a set of variables that can be adjusted to achieve a satisfactory layout;
    (b) expressing the satisfactory layout as a set of constraints, the set of constraints including required constraints and desired constraints, on the determined set of variables wherein at least one of the desired constraints is expressed as being optimizable, each required constraint specifying a relationship between a variable and a document layout value, each desired constraint being an objective function;
    (c) inputting a plurality of sets of document layout values, each set of document layout values representing a specific document layout;
    (d) solving the required constraints for each document layout;
    (e) solving the desired constraints for each document layout to establish a score for each document layout; and
    (f) selecting the document layout having each solved required constraint relationship of the document layout satisfied and a highest score to be the satisfactory layout.

2. The method for automatic document component layout as in claim 1, wherein each desired constraint is weighted.

3. A method for automatic document component layout comprising:
    (a) determining a set of variables that can be adjusted to achieve a satisfactory layout;
    (b) expressing the satisfactory layout as a set of constraints, the set of constraints including required constraints and desired constraints, on the determined set of variables wherein at least one of the desired constraints is expressed as being optimizable, each required constraint specifying a relationship between a variable and a document layout value, each desired constraint being an objective function;
    (c) inputting a plurality of sets of document layout values, each set of document layout values representing a specific document layout;
    (d) solving the required constraints for each document layout;
    (e) solving the desired constraints for each document layout to establish a score for each document layout; and
    (f) selecting the document layout having each solved required constraint relationship of the document layout satisfied and a lowest score to be the satisfactory layout.

4. The method for automatic document component layout as in claim 3, wherein each desired constraint is weighted.

5. A method for automatic document component layout comprising:
    (a) creating a population of document layout members, each document layout being represented by a plurality of document layout values, each document layout value corresponding to a document layout variable;
    (b) establishing a set of constraints, the set of constraints including required constraints and desired constraints, each required constraint specifying a relationship between a variable and a document layout value, each desired constraint being an objective function;

(c) solving the required constraints for each document layout member;

(d) solving the desired constraints for each document layout member to establish a score for each document layout member;

(e) selecting the document layout members having each solved required constraint relationship of the document layout satisfied and a score greater that a predetermined score;

(f) creating a new population of children document layout members by performing crossover/mutation operations upon the selected document layout members;

(g) solving the required constraints for each child document layout member;

(h) solving the desired constraints for each child document layout member to establish a score for each child document layout member;

(i) selecting the children document layout members having each solved required constraint relationship of the document layout satisfied and a score greater that a predetermined score; and (j) re-iterating the creating, solving, and selecting processes until a termination condition is realized.

6. The method for automatic document component layout as in claim 5, wherein the termination condition is defined as a failure to improve the layout after a predetermined number of iterations.

7. The method for automatic document component layout as in claim 5, wherein the termination condition is defined as a predetermined number of iterations.

8. The method for automatic document component layout as in claim 5, wherein the termination condition is defined as when the selecting process fails to select a document layout member from the population that has each solved required constraint relationship of the document layout satisfied and a score greater that a predetermined score.

* * * * *